C. C. LAPHAM.
MOTOR VEHICLE.
APPLICATION FILED JAN. 16, 1913.
1,267,561.
Patented May 28, 1918.
2 SHEETS—SHEET 1.
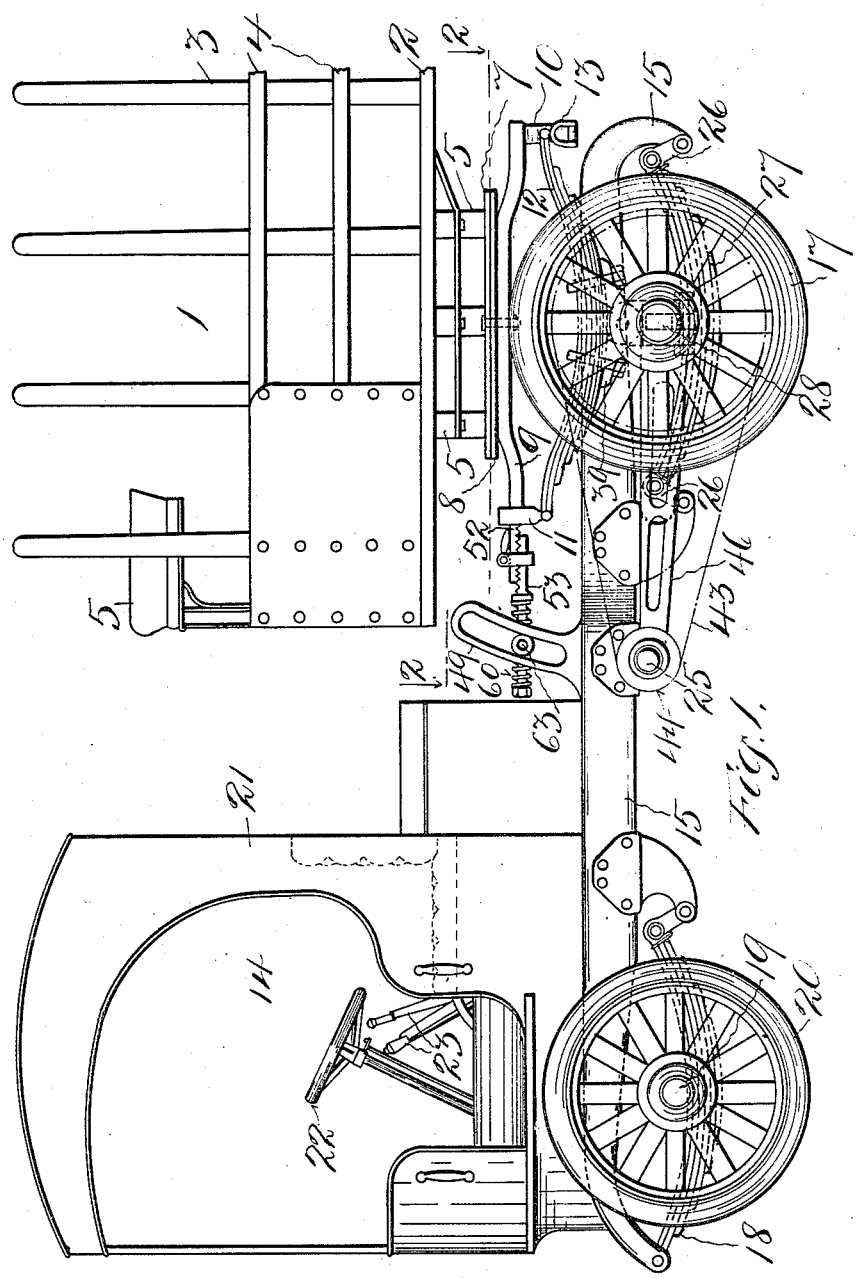

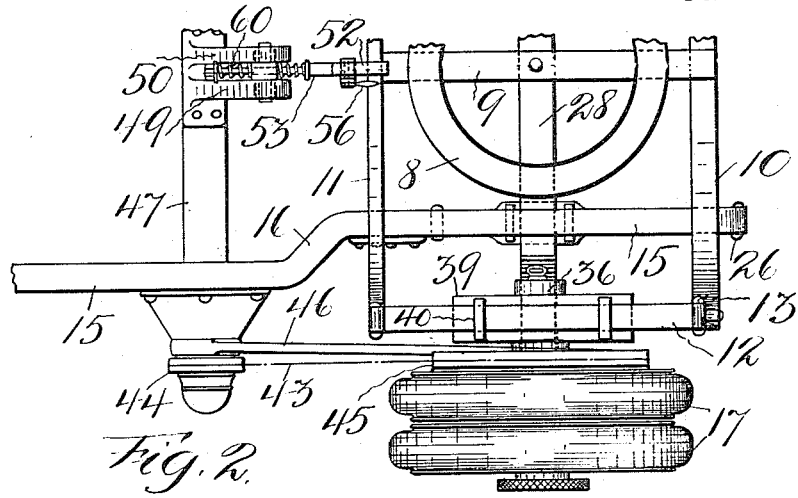
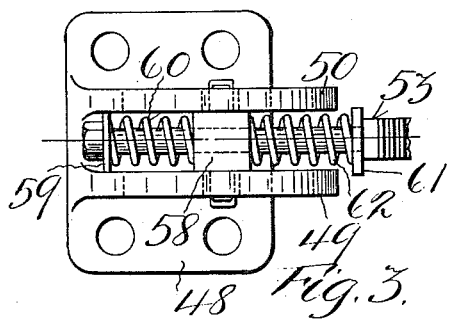
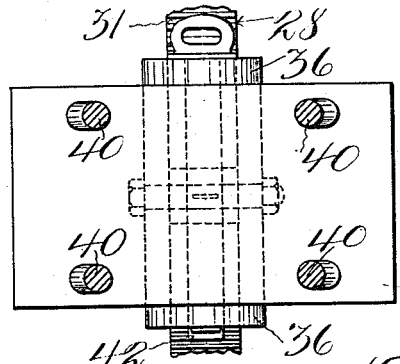
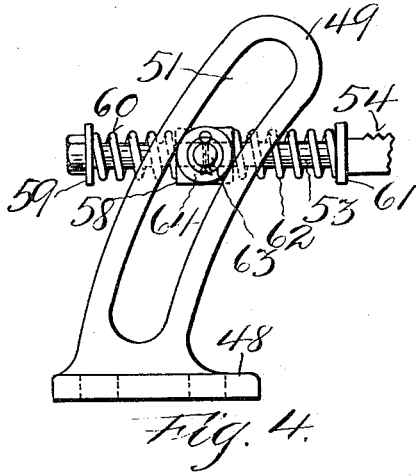
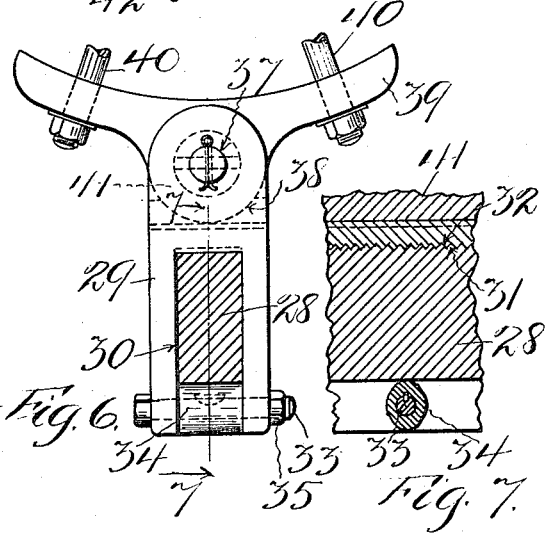

UNITED STATES PATENT OFFICE.

CHARLES C. LAPHAM, OF NEW YORK, N. Y., ASSIGNOR OF ONE-HALF TO WALTER S. LAPHAM, OF NEW YORK, N. Y.

MOTOR-VEHICLE.

1,267,561.  Specification of Letters Patent.  Patented May 28, 1918.

Application filed January 16, 1913. Serial No. 742,365.

*To all whom it may concern:*

Be it known that I, CHARLES C. LAPHAM, a citizen of the United States, and a resident of the city, county, and State of New York, have invented certain new and useful Motor-Vehicles, of which the following is a specification.

My invention relates to improved motor vehicles and more especially to vehicles adapted for trucking and hauling of wares and merchandise, and it therefore relates more particularly to motor trucks. The principal object of my invention is to provide a vehicle in the nature of a tractor and to so combine the tractor and a vehicle to be drawn or hauled thereby, that both tractor and the vehicle drawn by it, will carry their load in the most advantageous manner. The principal object of my invention is to utilize trucks, wagons and similar vehicles other than self propelled vehicles, of ordinary or special construction, and to convert them into self propelled vehicles by providing a suitable tractor, which may readily be attached to the above character of vehicle to provide the propelling means therefor; and the tractor is readily detachable from the load carrying vehicle in order that the latter may be otherwise used, and in order that a single tractor may be used in conjunction with a number of load carrying vehicles. Thus ordinary vehicles now in use may, without expensive modification or reconstruction, be converted into a self propelled vehicle; and, where quantities of material are to be hauled between two or more places, the tractor may be readily attached to and detached from the truck or wagon, so that the tractor may be used to haul one truck or wagon from the point of loading to the point of delivery, then be detached therefrom and returned for a second wagon or truck while the first one is being unloaded; and in this manner one tractor may be utilized in many instances for operating a number of wagons or trucks.

My invention relates more to the construction of the tractor whereby the same may be attached to ordinary wagons or trucks and to the means of attachment, so that as much of the original truck or wagon as practicable will be utilized in the combined vehicle.

Another object of my invention is to utilize the spring system of the wagon or truck with which the tractor is associated, to support the wagon or truck and its load. There is not only the advantage of the saving of expense in such an arrangement, but, since the original spring system of the wagon or truck is constructed with particular regard for the load which the wagon or truck is adapted to carry, the same tractor may be used in conjunction with different load carrying vehicles. For instance, a tractor may be used at one time for hauling a five ton truck and at another time for hauling a ten ton truck and no rearrangement of the spring systems will be necessary to secure proper support of the load, because the springs of the tractor carry a substantially unvarying load, while the springs of the different trucks or wagons carry the loads for which their particular vehicles are designed.

The load carrying vehicle and the tractor are connected by an articulate connection, so that the tractor may be cramped, in relation to the truck in order that the device as a whole may be turned about in a limited space and be easily guided in and out between other vehicles.

The connection between the tractor and truck is such that they may rock in such relation with each other that they may independently follow the irregularities of the road and the tractor may incline when going up or down a grade independently of the truck.

The distribution of the draw is such, that a part of the drawing action of the tractor will be transmitted to the truck through the forward axle thereof and the forward spring system, while a part of the drawing action will affect the truck above the springs, or near the fifth wheel frame; and in this manner the drawing force is distributed to secure the best results and to relieve the truck springs of undue strains. The drawing force which acts upon the truck above its spring system is transmitted through a flexible connection, in order to prevent undesirable strains on the connections and in order to allow of a certain flexibility of movement between tractor and truck.

The structure is such, that the same distribution of draw is maintained in the above duplex connection, regardless of the inclinations of the tractor relative to the changing positions of the truck.

The connection between the tractor and truck permits each to rock independently of the other, and at the same time permits the truck body to move up and down as its springs contract and expand while the vehicle is passing over irregularities of the road, without undesirable effect upon the drawing connection between tractor and truck.

Another object of my invention is to provide a connection between tractor and truck which will be simple and which may be quickly made. Another object of my invention is to provide a construction having the above advantages, and wherein the tractor itself forms a complete vehicle.

Other advantages will be apparent from the detailed description hereinafter.

In the drawings forming a part of this application,

Figure 1 is a side elevation of my invention, in which only the forward portion of the truck is shown, Fig. 2 is a plan of various parts and is taken substantially on the line 2—2 of Fig. 1, but it only takes in a little more than half the width of the vehicles, since both halves are alike, Fig. 3 is a plan and Fig. 4 is a side elevation of the device for connecting the tractor with the truck above the spring system of the latter, Fig. 5 is a plan and Fig. 6 is a partial sectional view, showing the means for connecting the truck springs with the rear axle of the tractor, and Fig. 7 is a sectional view, taken on the line 7—7 of Fig. 6.

I have shown only such parts of the complete vehicle as may be necessary for a proper understanding of the present invention. For this purpose I have shown an ordinary wagon or truck 1, the rear portion of which is omitted for the sake of simplicity in the illustration. This vehicle may be any wagon or truck previously used as a horse drawn vehicle, or the same may be a specially constructed truck. In so far as the same is illustrated in the present drawing, the truck comprises side sills 2, side posts 3 and connecting side rails 4 as well as a driver's seat 5, which latter may be omitted if desired, inasmuch as the operator occupies a seat on the tractor when the truck is used in combination with the tractor. The above parts are shown as a common illustration of an ordinary truck, but it is to be understood that any ordinary wagon, truck, or similar vehicle may be attached to the tractor in a manner hereinafter described. The body 1 is provided near its forward end with the usual posts 6 which rest upon, and are connected to the upper half 7 of the fifth wheel of the truck. The lower half 8 of the fifth wheel has a sliding contact with the upper half 7 in the usual manner. The fifth wheel is supported upon the usual pivotal frame, which is here shown as consisting of the bars 9 which are connected to the cross bars 10, 11, arranged before and behind the fifth wheel. The cross bar 11 is connected at each end (for simplicity the construction on one side only of the truck being shown, it being understood that the other half is similar), with a half elliptic spring 12, which constitutes part of the ordinary spring system of the truck. The cross bar 10 is connected by a swing link 13 with the opposite end of the spring 12. The above parts constitute the ordinary truck in so far as the same is utilized in connection with the tractor, it being understood that the front axle and front wheels of the truck are removed before attaching the latter to the tractor.

The tractor, which is indicated generally by the numeral 14 may be variously constructed in so far as the forward part thereof is concerned. As an example, I have shown a chassis consisting of the side sills 15 extending from the forward end of the tractor to the rear, and curving inwardly at 16, to leave a space between the sills and the wheels 17, of the tractor, for a purpose which will appear in the subsequent description. The forward end of the chassis is here shown mounted upon a leaf spring 18 which is supported upon a forward axle 19, the latter being supported by the forward wheel 20. It is to be understood that the opposite side of the vehicle from that here shown is similarly constructed. A body 21 is shown supported upon the chassis, and I have also shown the usual steering gear 22 and the controlling levers 23. Any suitable motor may be mounted on a convenient part of the tractor and any ordinary or special transmission may be employed for operating the drive shaft 25 from the motor.

The tractor is constructed as a complete vehicle, and for that purpose I have shown the side sill 15 connected by links 26 with the leaf spring 27, which is supported upon the wheels 17, it being understood that the same construction is duplicated at the other side of the tractor.

The truck 1 is supported upon the rear of the tractor by means of a rocking or fulcrum connection, preferably directly over the rear axle 28, and in such a manner that the truck may have a free up and down motion, independent of any up and down motion of the chassis of the tractor. From the previous description, it will be apparent that the tractor is spring supported upon its forward and rearward axles, so that there may be a vertical movement between the tractor chassis, and its supporting wheels and axles. In order that the truck may have a similar movement, relatively to the supporting wheels, the truck is connected to the rear axle 28 independently of the chassis of the tractor. The device for connecting the truck with the axle 28 is shown in detail in Figs. 5 to 7. A block 29 is provided with a rectangular pocket 30 open at its lower end, which block receives in its rectangular opening, the axle 28 of the tractor. This block is movable along the axle and preferably between the wheels 17 and the side sill 15 of the chassis, in order to be adjusted in accordance with the position of the spring of the particular truck which is to be attached to the tractor. To secure this adjustment, the upper surface of the axle is preferably provided with a number of teeth 31 which engage with corresponding teeth 32 of the block 29, for the purpose of retaining the block in its different positions on the shaft. The bolt 33 passes through the lower ends of the block 29, below the axle 28, and the eccentric sleeve 34 keyed upon the bolt 33 serves to hold the teeth of the shaft and block, in interlocking relation. Whenever it is desired to adjust the position of the block on the axle the nut 35 is loosened, and the bolt 33 is turned, and with it the eccentric 34. When the latter is turned crosswise, the block 29 may be lifted sufficiently to disengage its teeth 32 from the teeth 31 of the axle, and the block may be moved along the axle to any desired position. The block may be again tightened by reversing the above operation.

The upper portion of the block 29 is provided with a pair of ears 36 having alining apertures 37; and between the ears there is formed in the block, a circular recess 38. A spring plate or cap 39 which is secured to the truck spring 12, by means of the clamps 40, is provided with a circular lower portion 41, which is received by and is adapted to rock in, the circular recess 38 of block 29, in order that the truck and tractor may have a vertical rocking motion in relation to each other. A shaft 42 extends through the apertures 37 in ears 36, through a corresponding aperture in the lower portion of the plate 41, and serves to hold the latter in pivotal connection with the supporting block 29. Preferably the weight of the forward end of the truck is borne by the plate 39 resting in the circular recess 38, of the block 29, in order that the weight of the truck will not rest upon the shaft 42.

From the above, it will be apparent that the weight of the forward end of the truck rests upon the rear axle of the tractor through the truck spring 12. It will also be apparent that I am able to utilize the ordinary truck, and its spring system, down as far as the connection between the truck and the tractor axle. It will also be apparent that the vertical movement of the truck body, resting upon its independent spring system, will be independent of any up and down movement of the tractor. It will also be apparent that the rocking on fulcrum connection between the truck body and the axle 28, will permit the tractor to assume any horizontal position without causing a corresponding change in the position of the truck body. That is to say, when the combined vehicle reaches an incline, the forward wheels 20 of the tractor will rise in advance of the rear wheels, and this will incline the tractor in advance of the change of inclination of the truck body, so that the change of inclination of the latter will, in fact, take place the same as if it were an independent vehicle.

Furthermore, the curving inwardly of the tractor side sills provides space between the latter and the rear wheels for attaching the truck springs; and, by arranging the truck springs outside of the rear tractor springs, or between the latter and the rear tractor springs, the best results are obtained, and the device is made simple.

The combined vehicle is preferably driven through a transmission mechanism, operating on the rear wheels 17 of the tractor. For simplicity, I have shown, diagrammatically, an ordinary drive or transmission, consisting of a chain 43, which travels over sprocket 44 on the driven shaft 25; and over a sprocket 45, connected in the usual way with the rear wheels 17 of the tractor. A radius bar 46 is preferably connected between the drive shaft 25, and the rear axle of the tractor for the pupose of retaining the shaft and axle in proper spaced relation, in the usual manner.

Through the connections thus far described, a certain amount of the drawing action is transmitted to the truck. That is to say, the connection between the spring 12, which forms a part of the truck structure, and the axle 28, causes a certain amount of the drawing power to be transmitted to the truck through the forward spring system thereof. The drawing action through these connections does not in any way interfere with the pivotal connection between the tractor and truck. Under my present invention, the drawing action does not entirely take place through the truck springs, as above set forth, but the action is divided or distributed. Upon a suitable part of the chassis, I attach upon the cross bar 47, a bracket 48, which has parallel, upwardly extending plates 49, 50, each of which has a curved guiding slot 51. Upon the cross bar 11 of the fifth wheel frame, of the truck there is attached a forwardly extending arm 52, which is detachably connected with the draw bar 53. In order to make a quick connection between the bar 52 and draw bar 53, I preferably provide teeth 54 on the above bars, which are held in interlocking connection by means of an eccentric 55, which is operated by a handle 56; and which is secured to the bar 52, by a clamp 57 which surrounds both bars 52 and 53. By turning the handle 56, the eccentric may be moved into a position to release or tighten the connection between the bars. The draw bar 53 is provided with a sliding block 58, and between this block and a collar 59, there is arranged a coil spring 60, which surrounds the draw bar. Between the same block 58 and a collar 61, there is also upon the draw bar, another coil spring 62. The block 58 is provided with oppositely and laterally extending pins 63 provided with rollers 64, which travel in the slots 51 of the guides 49, 50. The slots 51 are shaped in the form of a curve, the general shape of which is struck upon an arc, whose center is in line with the center of the shaft 42.

When the tractor is propelled by means of its motor, a certain amount of the draw will take place through the forward spring system of the truck, and preferably the device is so proportioned, that the percentage of the drawing force thus transmitted to the truck, will be more than half of the entire drawing force required to move the truck, although the proportion may be varied. The remainder of the drawing force is transmitted to the truck by the connection through the draw bar 53. That is, the forward movement of the brackets 49, 50 act upon the pins 63, the block 58, coil spring 60 and upon the draw bar, and the action is further transmitted from the draw bar through the bar 53 to the fifth wheel frame, and finally to the truck. This portion of the drawing action takes place simultaneously with that transmitted through the truck springs. It will also be noted that the drawing action transmitted through the draw bar, acts upon the truck structure above the supporting springs of the latter, or, in other words, it does not act through the truck springs. As the tractor changes its horizontal position while traveling over irregular surfaces, the relative positions of the truck and tractor will obviously change, owing to the pivotal connection between the tractor and truck. This will not interfere with the even action and distribution of the drawing force to the truck, because the line of fulcrum between the truck and tractor is at the axle 42 and the arc on which the slots 51 are struck, are concentric with said pivotal line. Therefore, when the truck and tractor pivot in relation to each other, there will be no change in the compression of the springs 60 by reason of the pivotal motion. It is also to be noted that, if the tractor chassis moves closer to the axle 28 under the compression of its supporting springs, at a time when there is no corresponding downward movement of the truck body, there will be no change in the compression of the spring 60 caused by this movement, owing to the shape and disposition of the connection formed by the pins 63 and the guiding slots 51. The spring 62 serves the same purpose while the vehicles are being moved backwardly that the spring 60 serves when the vehicles are moved forwardly, it being understood that the vehicles may be moved backwardly or forwardly.

Under my present invention, I am able to distribute the drawing action in such a manner as will secure the greatest practical advantages; to secure all the advantages of the pivotal connection between the tractor and truck, and without interfering with the uniform distribution of the driving action upon the truck under all conditions. I am also able to utilize the ordinary wagon or truck, and to adapt the connection, so that trucks having different widths of springs may be attached to the tractor.

Having described my invention, what I claim is:

1. A device of the character described, comprising a tractor having rear wheels and a rear axle, a vehicle drawn by said tractor and having forward supporting springs, and means adjustable along the said rear tractor axle for connecting the vehicle springs to the said rear tractor axle.

2. A device of the character described, comprising a tractor having rear wheels and a rear axle, side sills partially supported on said rear axle, a vehicle drawn by said tractor, having supporting springs, and means arranged outside of the side sills and adjustable along the rear tractor axle between the said sills and the rear tractor wheels, for securing said springs upon said rear axle.

3. A device of the character described, comprising a tractor, a vehicle having supporting springs, means connecting said vehicle and tractor so that a portion of the draw will be transmitted to said vehicle through its supporting springs and flexible, longitudinally resilient means connecting the tractor and vehicle so that a portion of the draw will be transmitted to the vehicle independently of said supporting springs above and simultaneously with the said first drawing action.

4. A device of the character described, comprising a tractor, a vehicle having supporting springs connected with the tractor so that a portion of the draw will be transmitted to the vehicle through said springs, and means connecting the tractor to the vehicle above said springs, whereby a portion of the draw will be transmitted to the vehicle without acting through said springs, said latter connection being resilient and adjustable so that the relative proportion of the draw transmitted through said latter connection may be adjusted.

5. A device of the character described, comprising a tractor, a vehicle drawn thereby, said vehicle having a fifth wheel, supporting springs below the fifth wheel, means connecting said springs with said tractor to be supported thereby, said connection being pivotal and longitudinally resilient and permitting the tractor and vehicle to swing vertically in relation to each other, and a second and flexible connection between said tractor and said vehicle below the said fifth wheel, whereby the draw will take place partly through the said springs and partly through said last connection and whereby the tractor may be turned on a horizontal axis in relation to the vehicle by reason of said fifth wheel.

6. A device of the character described, comprising a tractor, including front and rear axles and wheels, a chassis, springs supporting said chassis on said axles, a vehicle drawn by said tractor, said vehicle having supporting springs supported upon the rear axle of the tractor so that said chassis and said vehicle will have independent movement upon their respective supporting springs, and a draw connection between said tractor and said vehicle above the springs of the latter, said connection permitting the chassis and vehicle to move independently upon their respective springs without substantially changing the proportion of draw transmitted through said latter connection.

7. A device of the character described, comprising a tractor, a vehicle drawn thereby, and partially supported thereon, a pivotal connection between said vehicle and tractor which permits said vehicle and tractor to pivot vertically in relation to each other, a second connection for transmitting drawing force from the said tractor to said vehicle, comprising members having a contact which changes in accordance with the relative vertical pivoting of the tractor and truck so that the relative proportions of the drawing force transmitted to the vehicle through said connections will be substantially unchanged by said pivotal action.

8. A device of the character described, comprising a tractor, a vehicle, drawn thereby, means connecting the tractor and vehicle whereby they may swing on a substantially transverse horizontal axis in relation to each other, and whereby a portion of the draw will be transmitted to the vehicle through said connection, and a second draw connection between the tractor and vehicle, including a guide curved on an arc which is substantially concentric with said horizontal axis, and a member coöperating with said curved guide whereby the contact between said members will change as the vehicle and tractor pivot in relation to each other.

9. A device of the character described, comprising a tractor having forward and rearward wheels and axles, a chassis, springs supporting the chassis on said axles, a vehicle drawn by said tractor, said vehicle including a fifth wheel, supporting springs partially supporting the vehicle through said fifth wheel, means pivotally connecting said vehicle springs with the rear axle of the tractor so that said springs may rock on an axis transverse of the vehicle, a guide on said tractor having a slot curved on an arc concentric with the line of said transverse pivot, a draw bar having a moving contact with said slotted guide and connected with said vehicle so as to transmit drawing action to the lower portion of the fifth wheel, and above said vehicle springs.

10. A device of the character described, comprising a tractor, having a rear axle, and a vehicle drawn by the tractor, having supporting springs, and means for connecting said springs with the rear axle of the tractor, comprising a block having a recess to receive the rear axle of the tractor, engaging teeth on said axle and block, a bolt for locking said block on said axle, an eccentric on said bolt for tightening the connection between the block and axle, a spring plate secured to the vehicle spring, having a circular member, said block having a circular recess to receive the spring plate and ears between which the circular member of the spring plate is received, and a shaft passing through said ears and said spring plate.

Signed at the city, county and State of New York this 14th day of January, 1913.

CHARLES C. LAPHAM.

Witnesses:
EDWARD D. C. SPERRY,
A. B. DOLLARD.